US012652242B2

(12) United States Patent
Wang et al.

(10) Patent No.: US 12,652,242 B2
(45) Date of Patent: Jun. 9, 2026

(54) HARDWARE OFFLOAD FOR TRANSMIT PROCESSING OF PACKETS

(71) Applicant: Arista Networks, Inc., Santa Clara, CA (US)

(72) Inventors: Michael Chih-Yen Wang, Vancouver (CA); Navdeep Bhatia, Mountain View, CA (US); Dileep Ramesh, Sunnyvale, CA (US); Timur Cheremisov, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/620,865

(22) Filed: Mar. 28, 2024

(65) Prior Publication Data

US 2025/0310247 A1 Oct. 2, 2025

(51) Int. Cl.
H04L 45/586 (2022.01)
H04L 45/00 (2022.01)

(52) U.S. Cl.
CPC .......... H04L 45/566 (2013.01); H04L 45/586 (2013.01)

(58) Field of Classification Search
CPC ............................ H04L 45/566; H04L 45/586

USPC .......................................................... 709/238
See application file for complete search history.

(56) References Cited

U.S. PATENT DOCUMENTS

| | | | | |
|---|---|---|---|---|
| 10,050,854 B1 * | 8/2018 | Licking | .................. | H04L 45/74 |
| 11,356,333 B2 * | 6/2022 | Pang | ..................... | H04L 41/149 |
| 2007/0207591 A1 * | 9/2007 | Rahman | .................. | H04L 45/00 |
| | | | | 438/439 |

* cited by examiner

*Primary Examiner* — Joon H Hwang
(74) *Attorney, Agent, or Firm* — Tianyi He

(57) ABSTRACT

A software agent generates packet sessions and hands off the task of generating and routing the packets to a programmable hardware logic block, such as a packet processor. The software agent provides entries in one or more tables that are subsequently used by the packet processor to generate and route the packets. During a first stage, the packets are generated at an ingress pipeline. The packets are then transferred to an egress pipeline from which pipeline the packets are reinjected back into the ingress pipeline. During the second stage and at the ingress pipeline, routing information, representative of a network layer or a tunnel, to which the packets are to be routed, are added to the packets. The packets are then forwarded to the egress pipeline and subsequently routed to a next hop or tunnel leading to the packets' respective destination addresses.

12 Claims, 6 Drawing Sheets

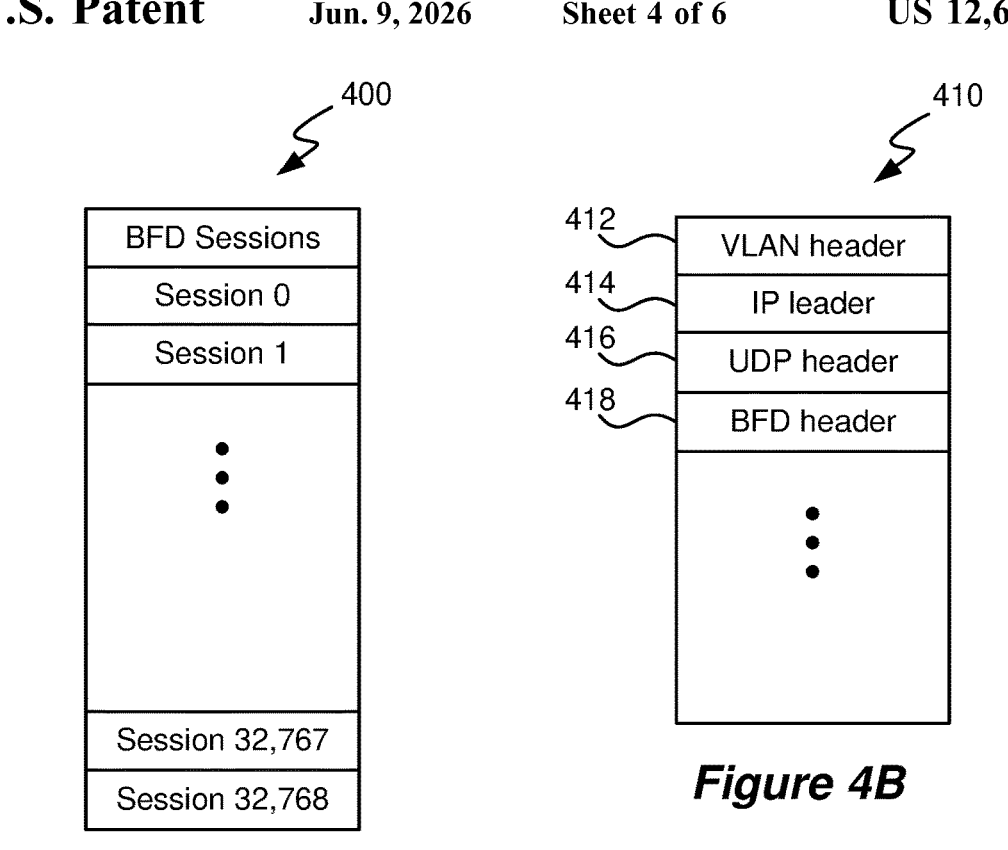
*Figure 4A*
*Figure 4B*
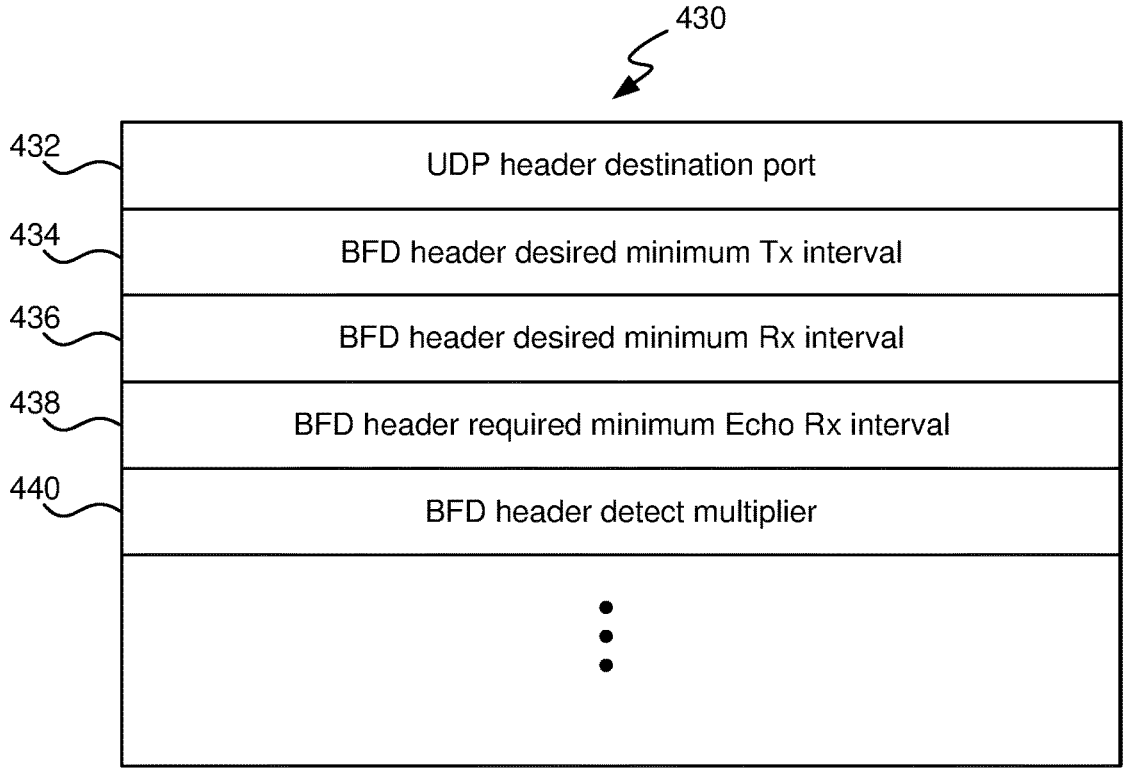
*Figure 4C*

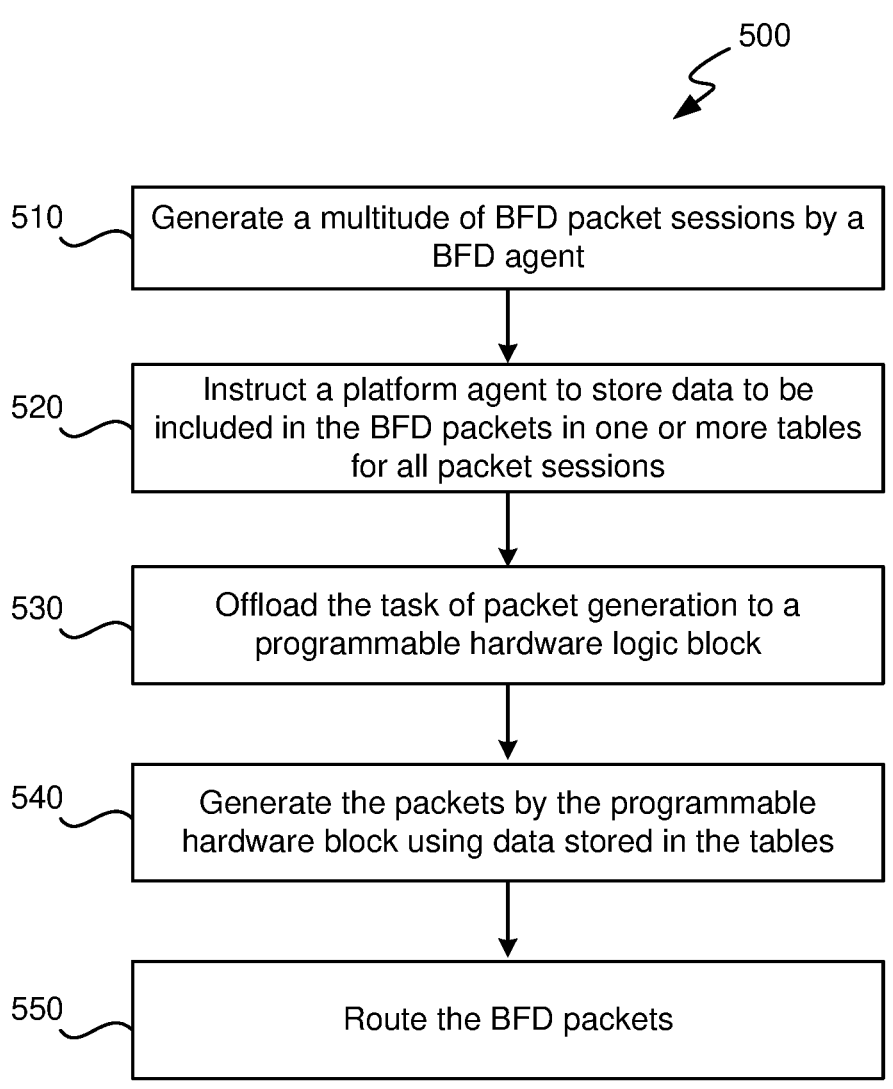

510 — Generate a multitude of BFD packet sessions by a BFD agent

520 — Instruct a platform agent to store data to be included in the BFD packets in one or more tables for all packet sessions 530 — Offload the task of packet generation to a programmable hardware logic block 540 — Generate the packets by the programmable hardware block using data stored in the tables 550 — Route the BFD packets

*Figure 5*

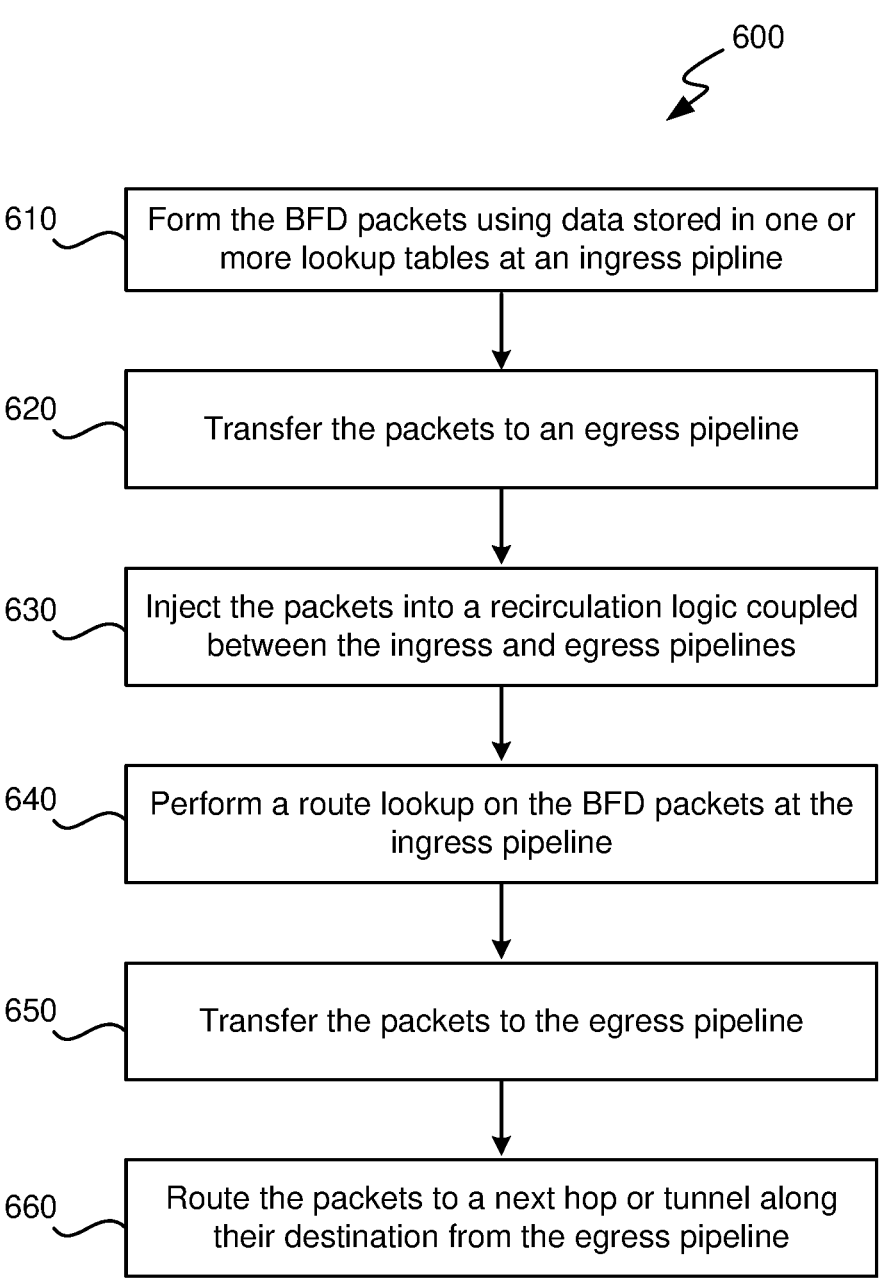

600

610 — Form the BFD packets using data stored in one or more lookup tables at an ingress pipline 620 — Transfer the packets to an egress pipeline 630 — Inject the packets into a recirculation logic coupled between the ingress and egress pipelines 640 — Perform a route lookup on the BFD packets at the ingress pipeline 650 — Transfer the packets to the egress pipeline 660 — Route the packets to a next hop or tunnel along their destination from the egress pipeline

*Figure 6*

HARDWARE OFFLOAD FOR TRANSMIT PROCESSING OF PACKETS

TECHNICAL FIELD

The present application relates to communication/data networks, and more particularly to formation and transmission of packets by a network device connected to such networks.

BACKGROUND

The need for packet formation and transmission at ever increasing rates continues to rise. Conventional software-based techniques are not suitable for processing of packets at such high rates, resulting in bottlenecks, and inefficiencies.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIGS. 4A, 4B and 4C show a number of tables used in forming and transmitting packets, in accordance with one embodiment of the present disclosure.

FIG. 5 is a flowchart for generating and routing BFD packets, in accordance with one exemplary embodiment of the present disclosure.

FIG. 6 is a flowchart for generating and routing BFD packets, as performed by a programmable hardware logic block, in accordance with one exemplary embodiment of the present disclosure.

DETAILED DESCRIPTION

Figure 1:
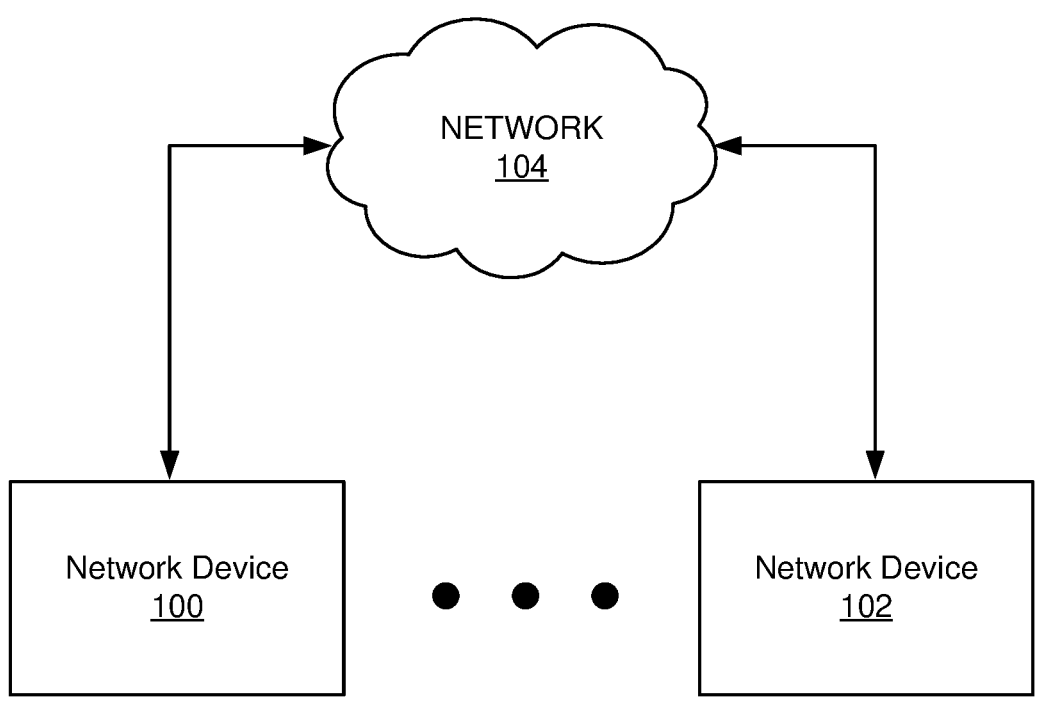
FIG. 1 is a high level block diagram of a pair of network devices that are in communication with one another via a network.

Conventionally, packet sessions, including the generation and routing of packets, such as bidirectional forwarding detection (BFD) packets, are generated either in software using a central processing unit, or by using a specialized hardware such as a co-processor. Neither of the conventional techniques is able to handle packet sessions at relatively large scale and exceeding, for example 2000 BFD packet sessions.

In accordance with one embodiment of the present disclosure, a software agent(s) generates the BFD packet sessions and hands off the process of packet generation and routing to a hardware logic block, such as a packet processor. The software agent(s) also provides entries in one or more tables formed in a memory of the packet processor. The packet processor generates the packets using the entries in the tables and subsequently routes the packets.

In one embodiment, the packet generation and routing are carried out in two stages. During the first stage, in conformity with a networking protocol, the packets are formed at an ingress pipeline of a packet processor and transferred to an egress pipeline of the packet processor. The packets are then reinjected back into the ingress pipeline via a recirculation logic coupled between the ingress and egress pipelines. At the ingress pipeline and during the second stage, header information, representative of a network layer or a tunnel to which the packets are to be routed, are added to the packets. The packets are then forwarded to the egress pipeline from which the packets are routed to their destination following a route lookup process.

By forming and reinjecting the packets back into the ingress pipeline prior to the packets' route lookup, the packet formation stage is therefore decoupled from the packet routing stage. Embodiments of the present disclosure enable packet sessions that are substantially higher in number than the number of sessions supported by existing software-based techniques. The decoupling further enables the packet sessions to be carried out in both underlay (regular session) as well as overlay (packets going in a tunnel) with relatively small amount of information exchanged between the BFD agent handling the sessions and the platform agent. It is understood that the BFD agent refers to a software module/agent that, among other functions, (i) runs on the control plane, as described further below, (ii) generates the BFD sessions and (iii) hands off the task of BFD packet formation and routing to the packet processor. The platform agent, which is also a software module/agent running on the control plane, among other functions, (i) receives data associated with the BFD packets from the BFD agent and (ii) programs a memory, disposed in the packet processor, to include one or more lookup tables to store such data.

Embodiments of the present disclosure further enable packet generation (formation) and routing (transmission) to be migrated from a software platform to a hardware platform (such as a packet processor) and back. For example, if the BFD agent sends a notification to offload the process of packet formation and transmission to a packet processor, and the platform agent is unable to offload that session for any reason, then the platform agent can notify the BFD agent accordingly so that the BFD agent can perform the required tasks in software.

Moreover, because the BFD packet formation is decoupled from the packet routing, when there are problems related to, for example, routing convergence or tunnel change, only a subset of parameters need to be changed. Therefore, changes in the next hop along the destination or the tunnel advantageously will not trigger any update from BFD agent to the platform agent, as is required by existing systems. In accordance with the present disclosure, once a session is established, only a change in any of the BFD header parameters needs to be communicated from the BFD agent to the platform agent. Embodiments of the present disclosure enable both single hop and multi-hop sessions which may be carried out on any layer-3 interface, such as routed interface, VLAN interface, port-channel interface, and the like.

The following description of the embodiments of the present disclosure are described with reference to forming and transmitting BFD packets. It is understood, however, that embodiments of the present disclosure are not so limited and equally apply to any other type of packets. As is known, BFD packets are used to monitor the status of a network connection and determine whether the network connection is active.

FIG. 1 is a high level block diagram of a pair of network devices 100 and 102 that are connected to one another via network 104. Each of network devices 100 and 102 includes a processor, a memory, as well as communications/networking circuitry. Network devices 100 and 102 may be a network switch, a router, a multilayer switch, a fiber channel device, an InfiniBand® device, and the like. Network 104 may be a local area network (LAN), a wide area network (WAN) (e.g., the Internet), a mobile network, or any other type of network that enables transfer of information between the network devices that are connected thereto, such as network devices 100 and 102.

Figure 2:
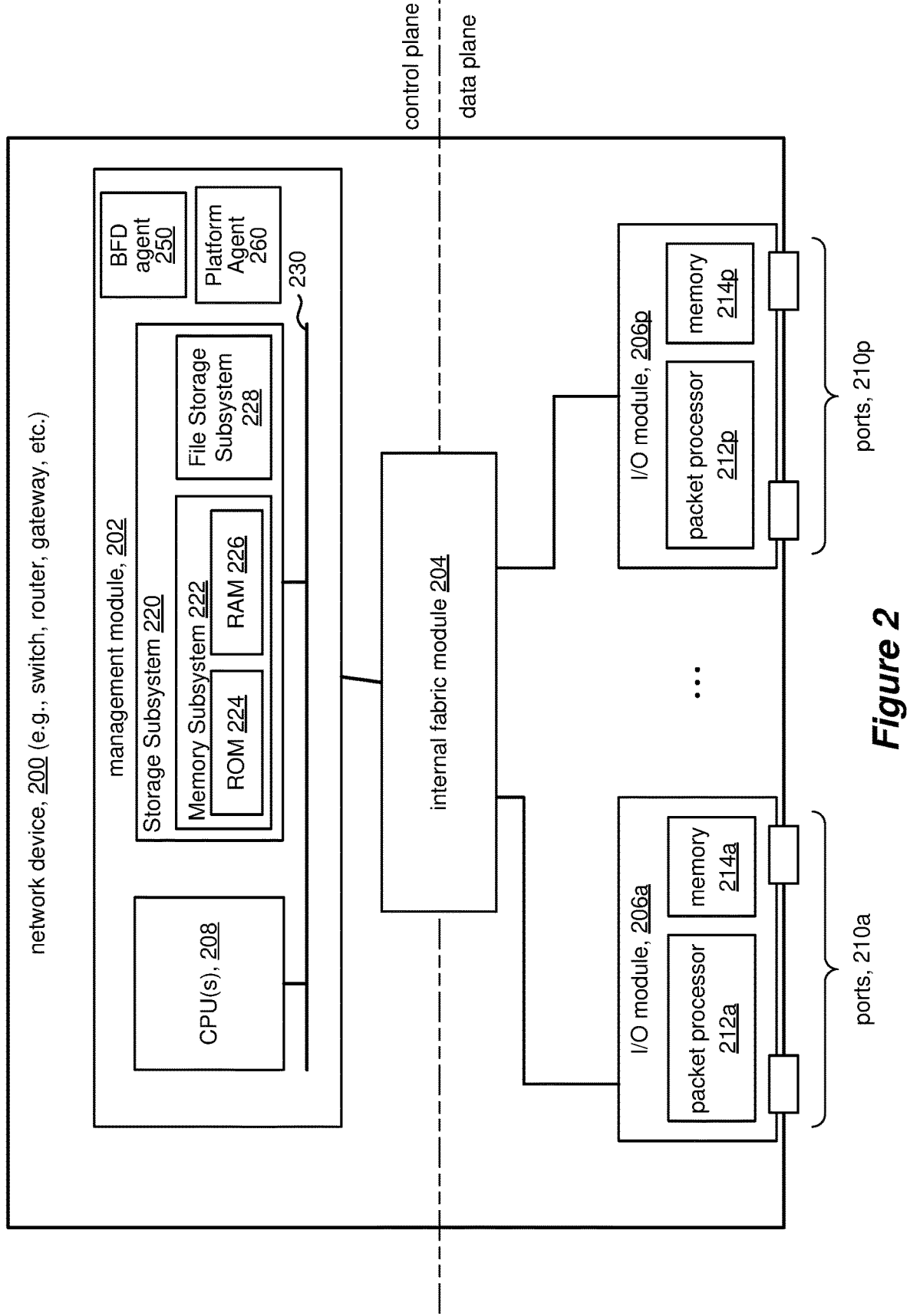
FIG. 2 shows more details of the network devices of FIG. 1.

FIG. 2 is a schematic diagram of a network device (e.g., switch, router, etc.) that may be used in accordance with the present disclosure and that corresponds to network devices 100 and 102 of FIG. 1. Network device 600 is shown as including a management module 202, an internal fabric module 204, and a number of I/O modules 206a-206p.

Management module 202 may form the control plane (also referred to as control layer or simply the CPU) of network device 200 and can include one or more management CPUs 208 for managing and controlling operation of network device 200 in accordance with the present disclosure. Each management CPU 208 may be a general-purpose processor, such as an Intel®/AMD® x86, ARM® microprocessor and the like, that operates under the control of software stored in a memory, such as ROM (read-only memory) 224 or RAM (random-access memory) 226. The control plane provides services that include traffic management functions such as routing, security, load balancing, analysis, and the like. In some examples, one or more management CPUs 208 may be configured to perform some or all of the methods disclosed herein, for example according to software stored in the ROM 224 and/or the RAM 226.

Management module 202 is also shown as including, in part, a BFD agent 250 and a platform agent 260. BFD agent 250 and platform agent 260 are software modules/agents that run on the control plane. BFD agent 250 generates the BFD sessions and hands off the task of packet formation and routing to one or more packet processors 212a-212p disposed respectively in I/O modules 206a-206p via platform agent 260. Platform agent 260 receives data associated with the BFD packets from BFD agent 250 and programs one or more of memories 214a-214p, also disposed in I/O modules 206a-206p, to include one or more lookup tables to store the data associated with the packets.

Management module 202 includes one or more management CPUs 208 that communicate with storage subsystem 220 via bus subsystem 230. Other subsystems, such as a network interface subsystem (not shown in FIG. 2), may be on bus subsystem 230. Storage subsystem 220 may include memory subsystem 222 and non-volatile storage subsystem 228. Storage subsystem 120 represents an example of non-transitory computer-readable storage media that can store program code and/or data, which when executed by one or more management CPUs 208, can cause one or more management CPUs 208 to perform operations in accordance with embodiments of the present disclosure.

Memory subsystem 222 may include a number of memories including main RAM 226 for storage of instructions and data during program execution and ROM (read-only memory) 224 in which fixed instructions and data are stored. Storage subsystem 228 can provide persistent (i.e., non-volatile) storage for program and data files, and can include various types of storage media known in the art such as solid-state drives, hard-disk drives, and so on.

One or more management CPUs 208 may run a network operating system stored in storage subsystem 220. A network operating system is a specialized operating system for network device 200 (e.g., a router, switch, firewall, and the like). For example, the network operating system may be Arista Extensible Operating System (EOS®), which is a fully programmable and highly modular, Linux-based network operating system. Other network operating systems may be used.

Bus subsystem 230 may provide a mechanism for enabling the various components and subsystems of management module 202 communicate with each other. Although bus subsystem 230 is shown schematically as a single bus, alternative embodiments of the bus subsystem can utilize multiple buses.

Internal fabric module 204 and I/O modules 206a-206p collectively represent the data plane of network device 200 (also referred to as data layer, forwarding plane, etc.). Internal fabric module 204 represents interconnections among the various other modules of network device 200. Each I/O module 206a-206p can include one or more input/output (ingress/egress) ports 210a-210p that are used by network device 200 to receive and forward network traffic. Each I/O module 206a-206p can also include packet processing capability, logically represented by respective packet processors 212a-212p and memory components 214a-214p. Packet processors 212a-212p may include, in part, forwarding hardware, including for example, data processing elements such as an ASIC (application specific integrated circuit), FPGA (field programmable array), digital processing unit, and the like. Memory components 214a-214p may include lookup hardware, including for example, content addressable memory such as TCAMs (ternary CAMs) and auxiliary memory such as SRAMs (static random access memory). The forwarding hardware in conjunction with the lookup hardware may provide instructions on how to process ingress packets and outgoing packets for egress. In accordance with some embodiments, a number of aspects of the present disclosure may be performed within the data plane.

Figure 3:
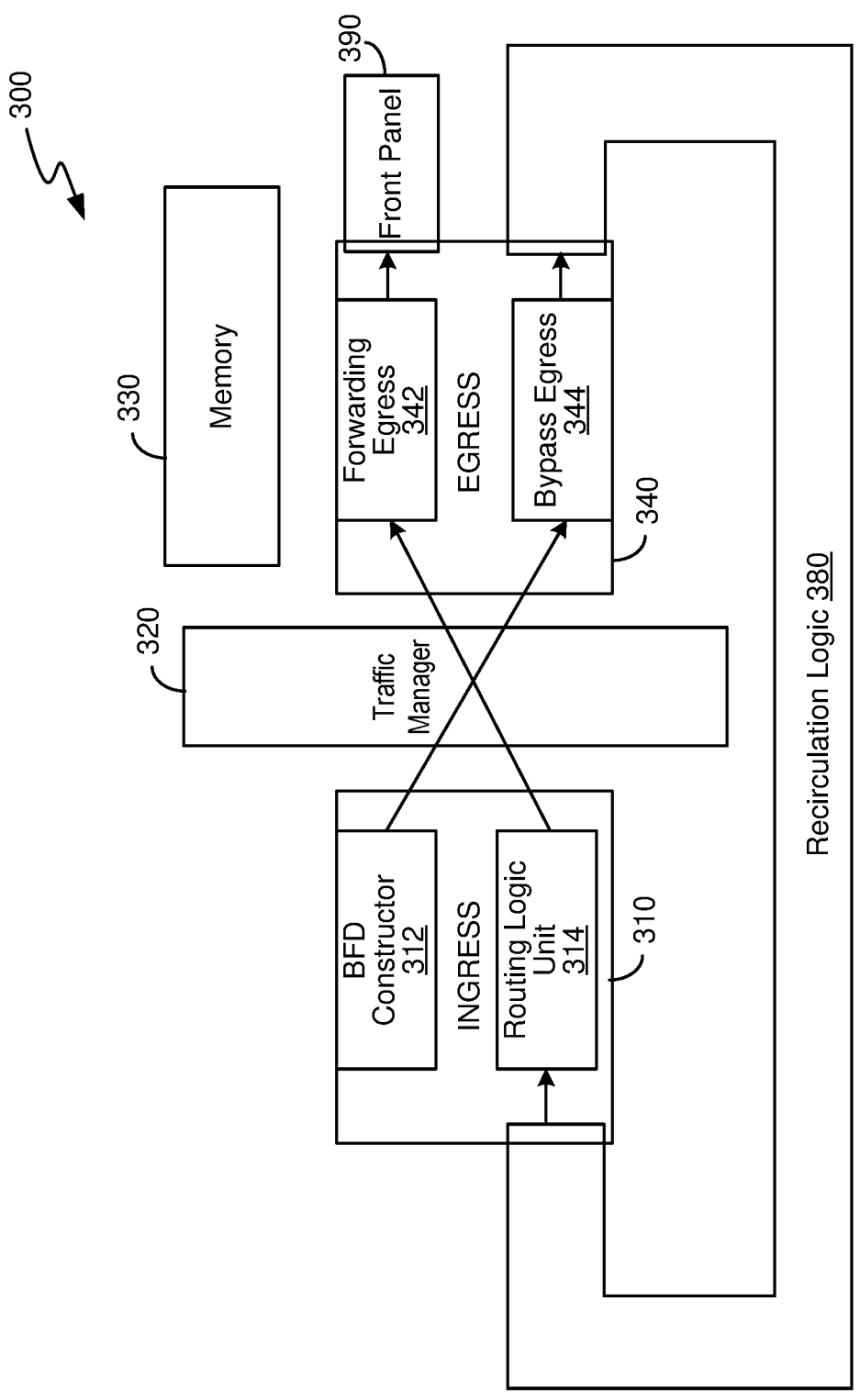
FIG. 3 shows a number of logic blocks of a packet processor configured to form and transmit packets, in accordance with one embodiment of the present disclosure.

FIG. 3 shows a number of components of a programmable hardware logic block 300, in accordance with one embodiment of the present disclosure. Programmable hardware logic block 300, which may be a packet processor corresponding to any of the packer processors 212a-212p shown in FIG. 2, may be a programmable Ethernet switch with components that are integrated on one or more silicon substrates.

Programmable hardware logic block 300 (alternatively referred to hereinafter as packet processor) is shown as including, in part, an ingress pipeline 310, an egress pipeline 340, a traffic manager 320, a recirculation logic 380, and a memory 330. Ingress pipeline 310 is shown as including, in part, a BFD packet constructor (alternatively referred to herein as packet construction unit) 312 and a routing logic unit 314. Egress pipeline 340 is shown as including, in part, a first egress block 344 that is also referred to herein as bypass egress block, and a second egress block 342 also referred to herein as forwarding egress block. Ingress pipeline 310 is shown as being in communications with egress pipeline 340 via recirculation logic 380. Forwarding egress block 342 is shown as being coupled to a front panel 390 of the egress pipeline 340.

BFD packet constructor 312 is configured to generate the BFD packets, using data stored by the platform agent in one or more lookup tables in memory 330, and transfer the BFD packets to bypass egress block 344 via traffic manager 320.

Routing logic unit 314 is configured, in part, to receive the BFD packets reinjected into the recirculation logic 380 by bypass egress block 344, add header and any other forwarding information that may be required to route the BFD packets (alternatively referred to as outgoing packet), and forward the packets to forwarding egress block 342. Traffic manager 320 is configured to control the transfer of packets from ingress pipeline 310 to egress pipeline 340. Forwarding egress block 342 is configured, in part, to forward the packets received from routing logic unit 314 to the next hop along the destination of the BFD packets via front panel 390.

In accordance with embodiments of the present disclosure, the BFD agent, as described above with reference to FIG. 2, generates the BFD sessions and hands off the task of packet formation and routing to packet processor 300. The BFD agent also delivers data associated with the BFD packets to the platform agent, also described above with reference to FIG. 2. In response, the BFD platform programs memory 330 to include one or more lookup tables and stores the data associated with the BFD packets in the lookup tables. BFD packet constructor 312 is configured to generate the BFD packets using the lookup tables included in memory 330.

The BFD packets are formed and transmitted at a user-configurable time interval for each BFD session. In one example, the BFD packets are formed and transmitted during every 300 msec time interval for each BFD session. However, the time interval for forming and transmitting BFD packets may be changed by the user. In one example, the number of BFD sessions that packet processor 300 may support is 32,728 ($2^{15}$) sessions. However, packet processor 300 may be programmed to support any number of BFD sessions, limited only by the amount of the memory, such as SRAM, available to store the BFD session.

As was described above, in accordance with a first aspect of the present disclosure, the BFD packets are formed during the first stage. FIG. 4A shows an example of a table 400 that is populated with BFD session numbers with which the BFD packets are associated. Therefore, when a BFD session starts, an entry is added to table 400 to identify the BFD session number of the associated BFD packets. Exemplary table 400 is shown as including $2^{15}$ entries thus supporting $2^{15}$ distinct BFD sessions.

Referring to FIGS. 3 and 4A concurrently, for each session that has an entry in table 400, packet constructor 312 uses one or more tables (that may be stored in memory 330) to generate a BFD packet during the user-configurable time interval (e.g., 300 msec) and inject the generated packet from ingress pipeline 310 to egress pipeline 340. For example, assume table 400 has been populated with 1000 BFD sessions. Therefore, during each, e.g. 300 msec, a BFD packet is generated for each of the 1000 sessions of table 400 and injected into (i.e., transferred to) egress pipeline 340.

FIG. 4B shows a Table 410 containing a set of exemplary parameters that get included in each BFD packet during the first stage. As shown, each BFD packet is populated with a virtual local area network (VLAN) header 412, an internet protocol (IP) header 414, a user datagram protocol (UDP) header 416, a BFD packet header 418, and the like. Table 410 may include additional parameters, such as BFD header length, BFD version, and the like, that are not shown for simplicity. The information in Table 410 is provided by the platform agent, which in turn, receives this information from the BFD agent.

FIG. 4C shows a table 430 that may also be used in generating the BFD packets during the first stage. Table 430 is shown as including a number of entries such as UDP header destination port 432, BFD header desired minimum TX interval 434, BFD header desired minimum RX interval 436, BFD header required minimum Echo RX interval 438, and BFD header detect multiplier 440, each of which entries may be 32 bits in one example. Table 430 is pointed to by a profile table (not shown) that is also stored in memory 330 of packet processor 300.

In one embodiment, to minimize hardware usage, each BFD session is assigned a profile identifier (ID) that is stored in the profile table. The profile ID, which may be a 16-bit number in one example, points to a set of corresponding entries in table 430. Accordingly, the entries in table 430 that are the same for different BFD sessions are pointed to by the profile ID of all such BFD sessions, thereby dispensing the need to store the same entries for each such BFD session separately. For example, if all the sessions in table 400 have the same session interval of 300 msec, all BFD sessions are assigned the same profile ID pointing to the same entries in table 430. Although the above description of BFD packet formation is made with reference to tables 400, 410 and 430, it is understood that embodiments of the present disclosure are not so limited, and that a BFD packet may be formed using any number of tables, e.g., one, two or otherwise. Moreover, such tables may be stored in the same or different memory spaces.

A BFD packet formed during the first stage is subsequently transferred from BFD constructor 312 to bypass egress block 344 by traffic manager 320. Thereafter, the packet is transferred via the recirculation logic 380 to routing logic unit 314, where the packet undergoes a routing lookup.

As described above, the BFD packets formed during the first stage may include, among other parameters, a VLAN header, an IP header, an Ethernet header, a UDP header, and a BFD header. When a BFD packet is received at routing logic unit 314, the packet's VLAN ID is retrieved from the VLAN header. The VLAN ID is then used to look up a virtual routing and forwarding (VRF) ID in a table (not shown) that may also be stored in memory 330. Each VRF ID corresponds to a routing table. The VRF ID together with the destination IP of the packet uniquely identify the next hop from the routing table to which the packet is to be routed. The BFD packet is therefore modified to include the header and any other forwarding information that may be required to route the modified packet (alternatively referred to as outgoing packet) to its final destination.

The next hop along the destination of a packet may either be a regular hop pointing to an egress interface, or may be a tunnel which will require the packet to undergo a virtual extensible LAN (VXLAN), a generic routing encapsulation (GRE), an IP-in-IP encapsulation, and the like. By decoupling the packet formation from the packet routing, as described in detail above, all Layer-2 network and Layer-3 network attributes/features become available for routing of the outgoing packets. Such decoupling further enables the BFD session to be carried out both in the underlay and/or the overlay. Moreover, because only the attributes required in forming the BFD packets and their destination information are communicated to the platform agent, the amount of information that is transmitted from the control plane to the platform agent is relatively small, thus enabling the packet formation and transmission to be carried out at relatively high scale and high speeds.

Embodiments of the present disclosure further enable packet formation and transmission to be migrated from a software platform to a hardware platform (such as packet processor 300 described above) and back. For example, if the BFD agent sends a session to the platform agent to offload the process of packet formation and transmission to, e.g. packet processor 300, and the platform agent is unable to offload that session for any reason, then the platform agent can notify the BFD agent accordingly so that the BFD agent can perform the required tasks in software.

Moreover, because the BFD packet formation is decoupled from packet routing, when there are problems related to, for example, routing convergence or tunnel change, only a subset of parameters need to be changed. Therefore, changes in the next hop along the destination or the tunnel advantageously will not trigger any update from BFD agent to the platform agent, as is required by existing systems. In accordance with the present disclosure, once a session is established, only a change in any of the BFD header parameters needs to be communicated from the BFD agent to the platform agent. Moreover, embodiments of the present disclosure enables both single hop and multi-hop BFD sessions which may be carried out on any Layer-3 interface, such as routed interface, VLAN interface, port-channel interface, and the like.

FIG. 5 is a flowchart 500 for generating and routing BFD packets, in accordance with one exemplary embodiment of the present disclosure. At 510, a BFD software agent generates a multitude of BFD packet sessions. At 520, the BFD software agent instructs a platform software agent to store data to be included in the BFD packets in one or more lookup tables for all packet sessions. At 530, the BFD software agent instructs the platform agent to offload the task of BFD packet generation and routing to a programmable hardware logic block, such as a packet processor. At 540, the programmable hardware logic block generates the BFD packets using the data stored in the one or more lookup tables. At 550, the programmable hardware logic block routes the generated BFD packets.

FIG. 6 is a flowchart 600 for generating and routing BFD packets, as performed by a programmable hardware logic block, such as a packet processor, in accordance with one exemplary embodiment of the present disclosure. At 610, the BFD packets are formed at an ingress pipeline using data stored in one or more lookup table. At 620, the BFD packets are transferred from the ingress pipeline to the egress pipeline. At 630, the BFD packets are injected into a recirculation logic coupled between the egress pipeline and the ingress pipeline. At 640, a route lookup is performed at the ingress pipeline for each BFD packet injected into the recirculation logic. At 650, the BFD packets are transferred to the egress pipeline. At 660, each BFD packet is routed to a next hop or tunnel along the packet's destination address.

The above description illustrates various embodiments of the present disclosure together with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method of generating and routing a packet, the method comprising:
   providing instructions from a software agent to a packet processor to generate the packet and to store data associated with the packet in one or more tables on a memory disposed in the packet processor, wherein the software agent is configured to generate a session for the packet and maintain a session identification of the packet and wherein the packet is a bidirectional forwarding detection (BFD) packet;
   including, by the packet processor, a plurality of header information in the packet, using the data stored in the one or more tables in accordance with the instructions provided by the software agent, during a first stage and at an ingress pipeline of the packet processor;
   transferring the packet from the ingress pipeline of the packet processor to an egress pipeline of the packet processor;
   injecting the packet from the egress pipeline of the packet processor to the ingress pipeline of the packet processor;
   determining, at the ingress pipeline of the packet processor and from the plurality of header information disposed in the packet injected from the egress pipeline to the ingress pipeline, a destination address of the packet injected from the egress pipeline to the ingress pipeline during a second stage;
   disposing, during the second stage, routing information in the packet injected from the egress pipeline to the ingress pipeline in accordance with the destination address; and
   routing the packet injected from the egress pipeline to the ingress pipeline, using the routing information, from the egress pipeline of the packet processor to a hop or tunnel leading to the destination address of the packet.

2. The method of claim 1 wherein the packet is injected from the egress pipeline to the ingress pipeline via a recirculation logic coupled between the ingress pipeline and the egress pipeline and wherein the routing information is disposed in the packet after being received via the recirculation logic.

3. The method of claim 1 wherein the destination address is an address in one of a tunnel, layer-4 network, or layer-3 network.

4. The method of claim 1 wherein the packet includes one or more of a bidirectional forwarding detection (BFD) header, internet protocol (IP) header, user datagram protocol (UDP) header, virtual local area network (VLAN) header, and Ethernet header.

5. The method of claim 4 further comprising:
   disposing the routing information in accordance with a virtual routing and forwarding identification of the packet determined using the VLAN header of the packet.

6. The method of claim 4 further comprising:
   encapsulating the packet in accordance with an encapsulation protocol.

7. A packet processor comprising:
   a memory;
   an ingress pipeline comprising:
      a packet construction unit; and
      a routing logic unit;
   an egress pipeline; and
   a recirculation logic coupled between the ingress pipeline and the egress pipeline;
      wherein the packet processor is configured to receive, from a software agent, instructions to generate a first packet and to store data associated with the first packet in one or more tables on the memory disposed in the packet processor,
      wherein the software agent is configured to generate a session for the first packet and maintain a session identification of the first packet, wherein the first packet is a bidirectional forwarding detection (BFD) packet, wherein the packet construction unit is configured to generate the first packet by including a plurality of header information in the first packet using the data stored in the one or more tables in accordance with the instructions received from the software agent and transfer the first packet to the egress pipeline, wherein the egress pipeline is configured to transfer the first packet to the routing logic unit via the recirculation logic, wherein the routing logic unit is configured to determine, from the plurality of header information disposed in the first packet transferred from the egress pipeline, a destination address of the first packet transferred from the egress pipeline, wherein the routing logic unit is further configured to dispose routing information in the first packet transferred from the egress pipeline in accordance with the destination address to generate an outgoing packet, wherein the routing logic is further configured to transfer the outgoing packet to the egress pipeline, and wherein the egress pipeline is configured to route the outgoing packet to a hop leading to the destination address of the packet.

8. A network device comprising:

a packet processor configured to:

receive instructions from a software agent to generate a packet and to store data associated with the packet in one or more tables on a memory disposed in the packet processor, wherein the software agent is configured to generate a session for the packet and maintain a session identification of the packet and wherein the packet is a bidirectional forwarding detection (BFD) packet;

include a plurality of header information in the packet, using the data stored in the one or more tables in accordance with the instructions received from the software agent, during a first stage and at an ingress pipeline of the packet processor;

transfer the packet from the ingress pipeline of the packet processor to an egress pipeline of the packet processor;

inject the packet from the egress pipeline of the packet processor to the ingress pipeline of the packet processor;

determine, at the ingress pipeline of the packet processor and from the plurality of header information disposed in the packet injected from the egress pipeline to the ingress pipeline, a destination address of the packet injected from the egress pipeline to the ingress pipeline during a second stage;

dispose, during the second stage, routing information in the packet injected from the egress pipeline to the ingress pipeline in accordance with the destination address; and route the packet injected from the egress pipeline to the ingress pipeline, using the routing information, from the egress pipeline of the packet processor to a hop or tunnel leading to the destination address of the packet.

9. The network device of claim 8 wherein the packet is injected from the egress pipeline to the ingress pipeline via a recirculation logic coupled between the ingress pipeline and the egress pipeline and wherein the routing information is disposed in the packet after being received via the recirculation logic.

10. The network device of claim 8 wherein the destination address is an address in one of a tunnel, layer-2 network, or layer-3 network.

11. The network device of claim 8 wherein the packet includes one or more of a bidirectional forwarding detection (BFD) header, internet protocol (IP) header, user datagram protocol (UDP) header, virtual local area network (VLAN) header, and Ethernet header.

12. The network device of claim 11 wherein the routing information is disposed in accordance with a virtual routing and forwarding identification of the packet determined using the VLAN header of the packet.

* * * * *